United States Patent
Vallamkondu et al.

(10) Patent No.: US 11,906,369 B2
(45) Date of Patent: Feb. 20, 2024

(54) OVERHEAT DETECTION WITH CLAMP HEALTH MONITORING

(71) Applicant: Kidde Technologies, Inc., Wilson, NC (US)

(72) Inventors: Aswin Kumar Vallamkondu, Karnataka (IN); Mark Sherwood Miller, Lakeville, MN (US); Stefan Coreth, Roanoke Rapids, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 161 days.

(21) Appl. No.: 17/529,868

(22) Filed: Nov. 18, 2021

(65) Prior Publication Data
US 2023/0092269 A1 Mar. 23, 2023

(30) Foreign Application Priority Data
Sep. 22, 2021 (IN) .............................. 202111042968

(51) Int. Cl.
*G01K 11/3206* (2021.01)
*B64D 45/00* (2006.01)
*G01K 1/14* (2021.01)
*G01H 9/00* (2006.01)

(52) U.S. Cl.
CPC .......... *G01K 11/3206* (2013.01); *B64D 45/00* (2013.01); *G01H 9/004* (2013.01); *B64D 2045/009* (2013.01); *B64D 2045/0085* (2013.01)

(58) Field of Classification Search
CPC ................................................ G01K 11/3206
See application file for complete search history.

(56) References Cited

U.S. PATENT DOCUMENTS

| 7,336,862 | B1 | 2/2008 | Xai et al. |
| 8,280,202 | B2 | 10/2012 | Xia et al. |
| 8,849,080 | B1 * | 9/2014 | Manzur ................... H01S 5/147 |
| | | | 385/38 |
| 10,712,212 | B2 | 7/2020 | Liu et al. |

(Continued)

FOREIGN PATENT DOCUMENTS

| CN | 106225908 A | 12/2016 |
| CN | 109269433 B | 8/2020 |
| EP | 3581895 A1 | 12/2019 |

OTHER PUBLICATIONS

Abstract for CN109269433 (B), Published: Aug. 4, 2020, 1 page.

(Continued)

*Primary Examiner* — Joseph H Feild
*Assistant Examiner* — Pameshanand Mahase
(74) *Attorney, Agent, or Firm* — CANTOR COLBURN LLP

(57) ABSTRACT

A detection system in an aircraft includes an optical fiber arranged along a structure of the aircraft and affixed to the structure with clamps that are spaced apart along the structure. The optical fiber includes two or more sets of fiber Bragg gratings (FBGs). The system also includes a light source to generate light with two or more wavelengths for injection into the optical fiber, and processing circuitry to identify an overheat condition and monitor vibration experienced by the optical fiber based on reflected signals generated by the two or more sets of FBGs. Integrity of the clamps is indicated by monitoring the vibration.

16 Claims, 4 Drawing Sheets

(56) References Cited

U.S. PATENT DOCUMENTS

| | | | | |
|---|---|---|---|---|
| 2004/0046109 A1* | 3/2004 | Chen | ................... | G01J 3/2803 |
| | | | | 250/227.14 |
| 2005/0111793 A1* | 5/2005 | Grattan | ................ | G01L 1/242 |
| | | | | 374/E11.016 |
| 2009/0154876 A1* | 6/2009 | McLaughlin | ...... | G02B 6/29311 |
| | | | | 385/36 |
| 2016/0033722 A1* | 2/2016 | Ray | ................... | G02B 6/4446 |
| | | | | 385/136 |
| 2017/0205254 A1* | 7/2017 | Park | ................... | G01D 5/3539 |
| 2017/0334574 A1 | 11/2017 | Wilson et al. | | |
| 2019/0383672 A1* | 12/2019 | Liu | ................ | G01D 5/35316 |

OTHER PUBLICATIONS

European Search Report for Application No. 22192231.3, dated Jan. 27, 2023, 7 pages.
Machine Translation for CN106225908 (A), Published: Dec. 14, 2016, 6 pages.

* cited by examiner

OVERHEAT DETECTION WITH CLAMP HEALTH MONITORING

CROSS-REFERENCE TO RELATED APPLICATIONS

This application claims the benefit of IN Patent Application No. 202111042968 filed Sep. 22, 2021, the disclosure of which is incorporated herein by reference in its entirety.

BACKGROUND

Exemplary embodiments pertain to the art of overheat detection and, in particular, to overheat detection with clamp health monitoring.

Overheat detection is especially important in an environment, such as an aircraft environment, that cannot practically be evacuated. Overheat detection may facilitate the mitigation of system failures. Overheat detection is typically performed along bleed air ducts and in compartments containing bleed air ducts. Bleed air refers to pressurized air that is bled from the compressor section of the engine or auxiliary power unit. The bleed air may be used for pressurization, air conditioning, wing and engine deicing, water system pressurization and other functions. A leak in the bleed air system can lead to loss of system function, overheat, or fire. In some cases, other areas containing heat generating equipment, such as the auxiliary power generation equipment, may also be monitored for overheat.

BRIEF DESCRIPTION

In one exemplary embodiment, a detection system in an aircraft includes an optical fiber arranged along a structure of the aircraft and affixed to the structure with clamps that are spaced apart along the structure. The optical fiber includes two or more sets of fiber Bragg gratings (FBGs). The system also includes a light source to generate light with two or more wavelengths for injection into the optical fiber and processing circuitry to identify an overheat condition and monitor vibration experienced by the optical fiber based on reflected signals generated by the two or more sets of FBGs. Integrity of the clamps is indicated by monitoring the vibration.

In addition to one or more of the features described herein, the system also includes one or more photodetectors to detect an amplitude of the reflected signals at different wavelengths.

In addition to one or more of the features described herein, the system also includes a circulator to direct the light from the light source into the optical fiber and to direct the reflected signals to the one or more photodetectors.

In addition to one or more of the features described herein, the light source generates the light as pulses, with each pulse having one of the two or more wavelengths.

In addition to one or more of the features described herein, the system also includes a second optical fiber arranged in parallel with the optical fiber along the structure and affixed with the clamps.

In addition to one or more of the features described herein, the second optical fiber includes the two or more sets of FBGs.

In addition to one or more of the features described herein, the processing circuitry identifies the overheat condition using the optical fiber and to identify the vibration using the second optical fiber.

In addition to one or more of the features described herein, each of the two or more FBGs of the optical fiber has a different grating pitch than others of the two or more FBGs and generates the reflected signals with a different reflected wavelength than the others of the two or more FBGs.

In addition to one or more of the features described herein, the overheat condition and the vibration cause a shift in the reflected wavelength of the reflected signals produced by affected ones of the two or more FBGs, the shift being periodic over a predefined duration when based on the vibration and the shift being non-periodic over the predefined duration when based on the overheat condition.

In addition to one or more of the features described herein, the processing circuitry identifies a portion of the optical fiber that experiences the overheat condition or the vibration and one or more of the clamps that are affected based on identifying which of the two or more FBGs are the affected ones of the two or more FBGs.

In another exemplary embodiment, a method of assembling a detection system in an aircraft includes arranging an optical fiber along a structure of the aircraft and affixed to the structure with clamps that are spaced apart along the structure. The optical fiber includes two or more sets of fiber Bragg gratings (FBGs). The method also includes arranging a light source to generate light with two or more wavelengths for injection into the optical fiber and configuring processing circuitry to identify an overheat condition and monitor vibration experienced by the optical fiber based on reflected signals generated by the two or more sets of FBGs. Integrity of the clamps is indicated by monitoring the vibration.

In addition to one or more of the features described herein, the method also includes arranging one or more photodetectors to detect an amplitude of the reflected signals at different wavelengths.

In addition to one or more of the features described herein, the method also includes arranging a circulator to direct the light from the light source into the optical fiber and to direct the reflected signals to the one or more photodetectors.

In addition to one or more of the features described herein, the arranging the light source includes configuring the light source to generate the light as pulses, with each pulse having one of the two or more wavelengths.

In addition to one or more of the features described herein, the method also includes arranging a second optical fiber in parallel with the optical fiber along the structure and affixed with the clamps.

In addition to one or more of the features described herein, the second optical fiber includes the two or more sets of FBGs.

In addition to one or more of the features described herein, the configuring the processing circuitry includes the processing circuitry identifying the overheat condition using the optical fiber and identifying the vibration using the second optical fiber.

In addition to one or more of the features described herein, the arranging the optical fiber includes each of the two or more FBGs of the optical fiber having a different grating pitch than others of the two or more FBGs and generating the reflected signals with a different reflected wavelength than the others of the two or more FBGs.

In addition to one or more of the features described herein, the configuring the processing circuitry to identify the overheat condition and monitor the vibration includes identifying that the overheat condition and the vibration cause a shift in the reflected wavelength of the reflected signals produced by affected ones of the two or more FBGs, the shift being periodic over a predefined duration when based on the vibration and the shift being non-periodic over the predefined duration when based on the overheat condition.

In addition to one or more of the features described herein, the configuring the processing circuitry includes the processing circuitry identifying a portion of the optical fiber that experiences the overheat condition or the vibration and one or more of the clamps that are affected based on identifying which of the two or more FBGs are the affected ones of the two or more FBGs.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an overheat detection system in an aircraft detects overheat conditions, for example, along bleed air ducts in various locations of aircraft such as the left and right engine strut, left and right wings and body, and main wheel well. A prior approach to overheat detection involves eutectic salt packed into an Inconel tube with a center nickel wire conductor. When an overheat condition occurs, impedance of the eutectic salt drops, causing current flow between the outer sheath and center nickel conductor that is sensed as a signal of the overheat condition. Another prior approach involves using an optical fiber with fiber Bragg gratings (FBGs) for overheat detection. In both cases, the Inconel tube or optical fiber may be run along an aircraft structure with clamps affixing the tube or fiber to the structure at different positions. These clamps hold the linear overheat sensors in place, ensuring proper positioning of the sensor as well as providing structure and strength to the sensor assembly. However, if one or more of the clamps is loose or broken, the result may be long unsupported sections of the tube or fiber that are vulnerable to vibration. The vibration can lead to failure of the overheat detection system. If a clamp fails, there may be insufficient support for the sensor holding structure. This lack of support could result in the structure experiencing higher than expected vibration and possibly sensor damage or loss of the intended functionality of overheat detection. Clamp damage may be caused during maintenance or because of aging and fatigue, for example.

Embodiments of the systems and methods detailed herein relate to overheat detection with clamp health monitoring. Two optical fibers secured by the same clamps may be used such that one performs overheat detection and the other performs vibration monitoring. Alternately, one optical fiber may be used to perform both overheat detection and vibration monitoring. Monitoring for loss of clamping capability may provide an alert to the possibility of eventual loss of the overheat sensor and may allow preventative maintenance to ensure continued proper operation of the overheat system. Optical fibers typically refer to a core, cladding, and coating. The optical fibers according to one or more embodiments may be within a protective tubing. Thus, for example, two optical fibers may refer to one tubing that includes the two sets of cores, cladding, and coating or two sets of cores, cladding, and coating in two separate tubes.

Figure 1:
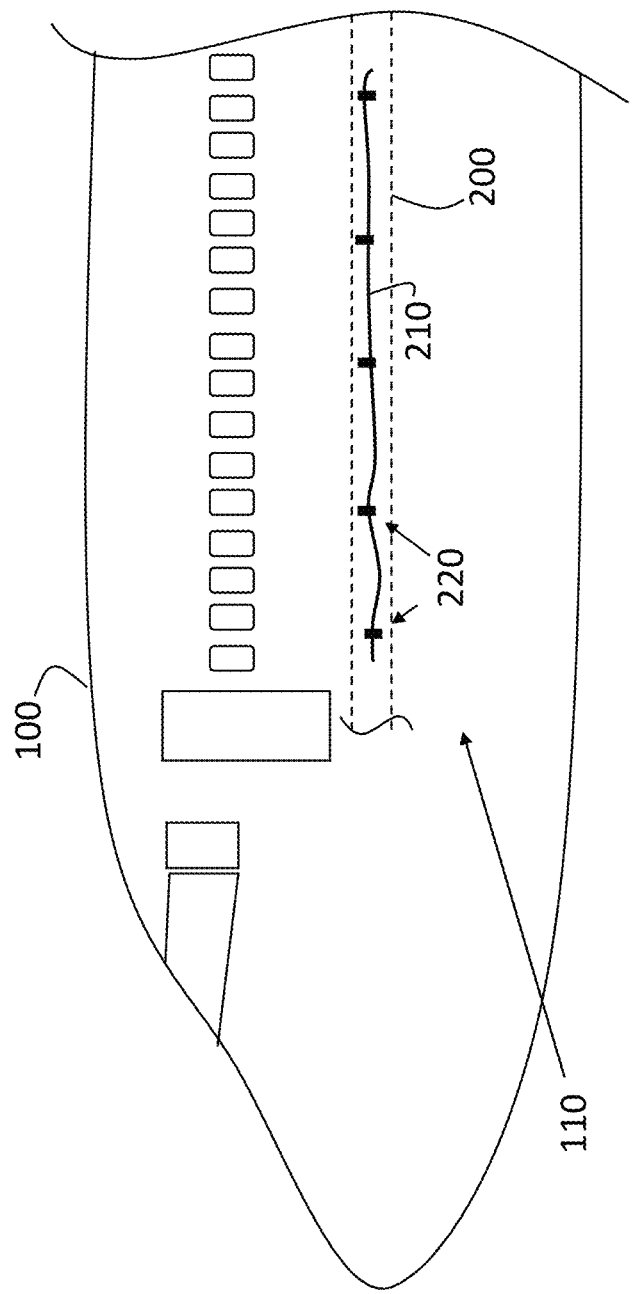
FIG. 1 illustrates aspects of an exemplary aircraft that includes an overheat detection system with clamp health monitoring according to one or more embodiments.

FIG. 1 illustrates aspects of an exemplary aircraft 100 that includes a detection system 110 that performs overheat detection and clamp health monitoring according to one or more embodiments. Part of a structure 200 (e.g., bleed air duct, fuselage) is shown. An optical fiber 210 is shown affixed to the structure 200 by clamps 220 that are spaced along the structure 200. As discussed with reference to FIG. 2, two optical fibers 210 may be part of the detection system 110 according to alternate embodiments. As discussed with reference to FIG. 3, light is injected into the one or more optical fibers 210 and reflected light is detected to monitor overheat and the condition of the clamps 220. As shown in FIG. 3, FBGs 310 are inscribed in the one or more optical fibers 210 to facilitate the monitoring.

Figure 2:
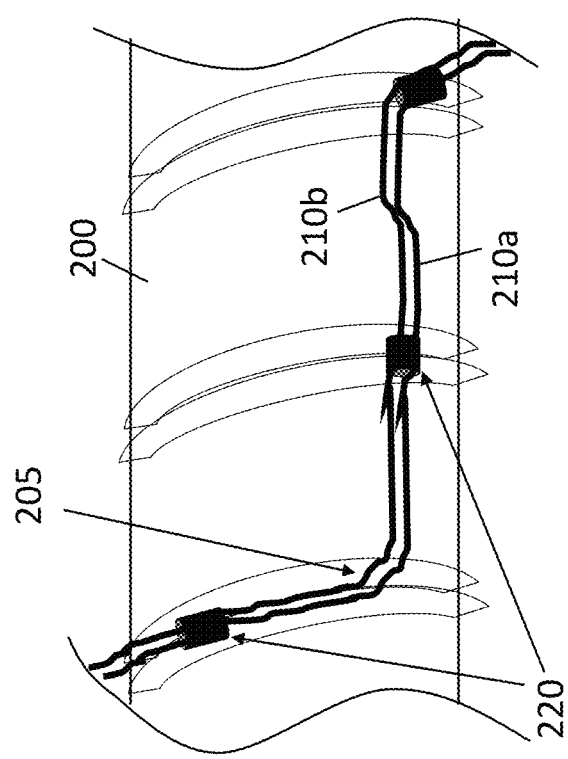
FIG. 2 illustrates aspects of an overheat detection system with clamp health monitoring according to one or more embodiments.
Figure 3:
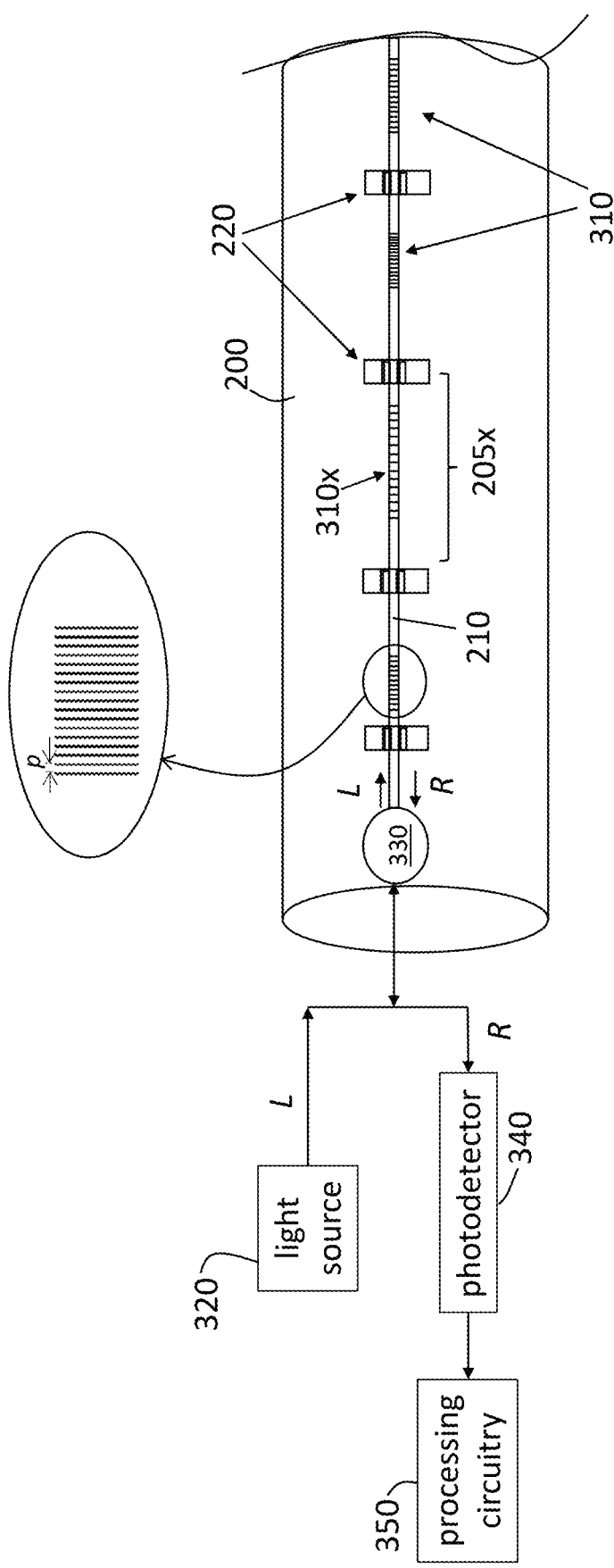
FIG. 3 details aspects of an overheat detection system with clamp health monitoring according to one or more embodiments.

FIG. 2 illustrates aspects of a detection system 110 that performs overheat detection and clamp health monitoring according to one or more embodiments. According to the exemplary embodiment shown in FIG. 2, one optical fiber 210a is used for overheat detection, and the other optical fiber 210b is used to monitor the state of the clamps 220. A long unsupported portion 205 of the optical fibers 210 is indicated. This area may have resulted from a clamp 220 breaking or falling off, for example, and the optical fiber 210 in this portion 205 may be more susceptible to vibration. The FBGs 310 inscribed at different parts of the optical fibers 210 are shown in FIG. 3 and the grating period of each set of FBGs 310 is different. The optical fibers 210a, 210b may be identical in the FBGs 310 that they include but could also have different variations in the grating period of the FBGs 310 according to alternate embodiments. In both the separate optical fiber 210 embodiment shown in FIG. 2 and the single optical fiber 210 shown in FIG. 3, the one or more optical fibers 210 may be single mode or multi-mode.

FIG. 3 details aspects of a detection system 110 that performs overheat detection and clamp health monitoring according to one or more embodiments. An optical fiber 210 is shown affixed to a structure 200 by clamps 220. FBGs 310 are shown inscribed in the optical fiber 210. Four sets of FBGs 310 are shown in FIG. 3. Each set of FBGs 310 has a different grating period p. A light source 320 produces light L. The light L may be produced in pulses with each pulse having a different wavelength $\lambda$, for example. A circulator 330 directs the light L from the light source 320 into the optical fiber 210. Each set of FBGs 310 reflects only the light of a particular wavelength $\lambda p_i$, that corresponds with its grating period $p_i$, where i is an index for each set of FBGs 310. Because each set of FBGs 310 has a different grating period $p_i$ each set of FBGs 310 reflects light of a different wavelength $\lambda p_i$.

When the optical fiber 210 is subjected to an overheat condition or vibration, a set of FBGs 310 that is affected (i.e., is also subjected to a temperature change or vibration) will reflect a wavelength $\lambda p_i'$, that is shifted from the wavelength $\lambda p_i$, corresponding to its initial grating period $p_i$. This is because a temperature change or vibration will change the initial grating period $p_i$ of the set of FBGs 310. By arranging an optical fiber 210, as shown, with different initial grating periods $p_i$ that reflect different wavelengths $\lambda p_i$, a shift in one or more of those wavelengths $\lambda p_i$, may be used to identify the affected area of the optical fiber 210.

For example, a portion 205x of the optical fiber 210 is indicated and includes a set of FBGs 310x. If the set of FBGs 310x initially provides reflections R of light with a wavelength $\lambda p_x$, that subsequently shifts to a wavelength $\lambda p_x'$, then an overheat condition or vibration in the portion 205x of the optical fiber 210 may be detected based on the shift. If vibration is detected, the clamps 220 on either side of the portion 205x may be checked. Alternately, a vibration indication by one of the sets of FBGs 310 on either side of the FBGs 310x may help to identify which clamp 220 in particular may be damaged. That is, if the FBGs to the right of the FBGs 310x also indicate vibration, then the clamp 220 between the FBGs 310x and the FBGs 310 to their right may be isolated for inspection, repair, or replacement. In an alternate embodiment, the FBGs 310 may be disposed at the clamps 220 rather than between them. More specifically in the exemplary embodiment with a separate optical fiber 210 used for vibration detection and, thus, clamp health monitoring, the FBGs 310 of the clamp health monitoring optical fiber 210 may be disposed at the clamps 220. In this case, any change in strain of a clamp 220 (e.g., loosening of the clamp 220) may be detected based on reflections R from the corresponding FBG 310.

The reflections R are directed by the circulator 330 to one or more photodetectors 340. That is, the photodetector 340 shown in FIG. 3 may be an array of photodetectors that each detect a different wavelength or wavelength range. The amplitude detected by the one or more photodetectors 340 may then be provided to processing circuitry 350. The processing circuitry 350 may include one or more memory devices and processors. The processing circuitry 350 may identify the portion 205 of the optical fiber 210 (and thus identify proximate clamps 220) affected by overheat or vibration and provide an alert, for example. An overheat condition may be distinguished from vibration based on a rate of change of the reflected wavelength from a given set of FBGs 310 and periodicity of the change within a duration d, as further discussed with reference to FIG. 4.

Figure 4:
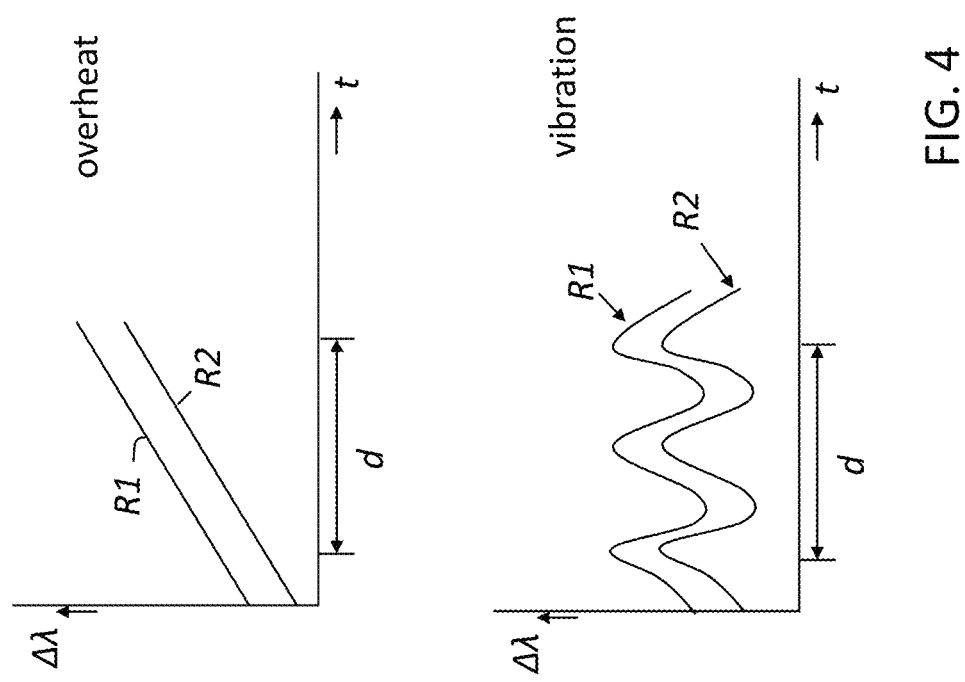
FIG. 4 shows exemplary reflections resulting from an overheat condition and from vibration in an overheat detection system with clamp health monitoring according to one or more embodiments.

FIG. 4 shows exemplary reflections R1 and R2 resulting from an overheat condition and from vibration. Each of the reflections R1 and R2 may correspond to a different FBG 310, and each of the graphs may correspond to a different optical fiber 210 according to the exemplary embodiment shown in FIG. 2. As FIG. 4 indicates, over a duration d, an overheat condition may be distinguished from vibration based on the reflections R1 and R2. As shown, over the duration d, a temperature increase results in an increase in wavelength shift $\Delta\lambda$ over time. In that same duration d, an increase in vibration results in a periodic wavelength shift $\Delta\lambda$. Because some vibration is generally present in an aircraft 100, a baseline vibration may be subtracted from the vibration result to determine if additional vibration resulting from an issue with one or more clamps 220 is present. The baseline vibration may be a calibrated value based on a type of aircraft 100, for example. That is, vibration may result in a high rate of change of the shifted wavelength $\lambda p_i'$ that is periodic, while a temperature increase (i.e., overheat condition) may result in a relatively low rate of change of the shifted wavelength $\lambda p_i'$, that is also periodic.

As noted with reference to FIG. 2, when a second optical fiber 210 is present, one optical fiber 210 may be used to monitor vibration while the other is used to perform overheat detection. When two separate optical fibers 210 are used, they may be in the same or in different protective tubes, a previously noted. The frequency of light L injected into the optical fiber 210 that is used for overheat detection may be selected to minimize the effect of vibration. Similarly, the frequency of light L injected into the optical fiber 210 that is used for overheat detection may be tuned to clearly demonstrate the vibration effects.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A detection system in an aircraft comprising:
an optical fiber arranged along a structure of the aircraft and affixed to the structure with clamps that are spaced apart along the structure, wherein the optical fiber includes two or more sets of fiber Bragg gratings (FBGs);
a light source configured to generate light with two or more wavelengths for injection into the optical fiber; and
processing circuitry configured to identify an overheat condition and monitor vibration experienced by the optical fiber based on reflected signals generated by the two or more sets of FBGs, wherein integrity of the clamps is indicated by monitoring the vibration;
wherein each of the two or more FBGs of the optical fiber has a different grating pitch than others of the two or more FBGs and generates the reflected signals with a different reflected wavelength than the others of the two or more FBGs; and
wherein the overheat condition and the vibration cause a shift in the reflected wavelength of the reflected signals produced by affected ones of the two or more FBGs, the shift being periodic over a predefined duration when based on the vibration and the shift being non-periodic over the predefined duration when based on the overheat condition.

2. The system according to claim 1, further comprising one or more photodetectors configured to detect an amplitude of the reflected signals at different wavelengths.

3. The system according to claim 2, further comprising a circulator configured to direct the light from the light source into the optical fiber and to direct the reflected signals to the one or more photodetectors.

4. The system according to claim 1, wherein the light source is configured to generate the light as pulses, with each pulse having one of the two or more wavelengths.

5. The system according to claim 1, wherein the optical fiber is first optical fiber, the system further comprising a second optical fiber arranged in parallel with the first optical fiber along the structure and affixed with the clamps.

6. The system according to claim 5, wherein the second optical fiber includes the two or more sets of FBGs.

7. The system according to claim 6, wherein the processing circuitry is configured to identify the first optical fiber to identify the overheat condition and the processing circuitry is configured to use the second optical fiber to identify the vibration.

8. The system according to claim 1, wherein the processing circuitry identifies a portion of the optical fiber that experiences the overheat condition or the vibration and one or more of the clamps that are affected based on identifying which of the two or more FBGs are the affected ones of the two or more FBGs.

9. A method of assembling a detection system in an aircraft comprising:
arranging an optical fiber along a structure of the aircraft and affixed to the structure with clamps that are spaced apart along the structure, wherein the optical fiber includes two or more sets of fiber Bragg gratings (FBGs);
arranging a light source to generate light with two or more wavelengths for injection into the optical fiber; and
configuring processing circuitry to identify an overheat condition and monitor vibration experienced by the optical fiber based on reflected signals generated by the two or more sets of FBGs, wherein integrity of the clamps is indicated by monitoring the vibration;
wherein the arranging the optical fiber includes each of the two or more FBGs of the optical fiber having a different grating pitch than others of the two or more FBGs and generating the reflected signals with a different reflected wavelength than the others of the two or more FBGs; and
wherein the configuring the processing circuitry to identify the overheat condition and monitor the vibration includes identifying that the overheat condition and the vibration cause a shift in the reflected wavelength of the reflected signals produced by affected ones of the two or more FBGs, the shift being periodic over a predefined duration when based on the vibration and the shift being non-periodic over the predefined duration when based on the overheat condition.

10. The method according to claim 9, further comprising arranging one or more photodetectors to detect an amplitude of the reflected signals at different wavelengths.

11. The method according to claim 10, further comprising arranging a circulator to direct the light from the light source into the optical fiber and to direct the reflected signals to the one or more photodetectors.

12. The method according to claim 9, wherein the arranging the light source includes configuring the light source to generate the light as pulses, with each pulse having one of the two or more wavelengths.

13. The method according to claim 9, wherein the optical fiber includes a first optical fiber and a second optical fiber, wherein arranging the optical fiber includes arranging the first and second optical fibers in parallel along the structure and affixed with the clamps.

14. The method according to claim 13, wherein the second optical fiber includes the two or more sets of FBGs.

15. The method according to claim 14, wherein the configuring the processing circuitry includes configuring the processing circuitry to use the first optical fiber to identify the overheat condition and configuring the processing circuit to use the second optical fiber to identify the vibration.

16. The method according to claim 9, wherein the configuring the processing circuitry includes the processing circuitry identifying a portion of the optical fiber that experiences the overheat condition or the vibration and one or more of the clamps that are affected based on identifying which of the two or more FBGs are the affected ones of the two or more FBGs.

* * * * *